(No Model.)
E. E. BOSTWICK.
HARROW.
No. 291,869. Patented Jan. 15, 1884.
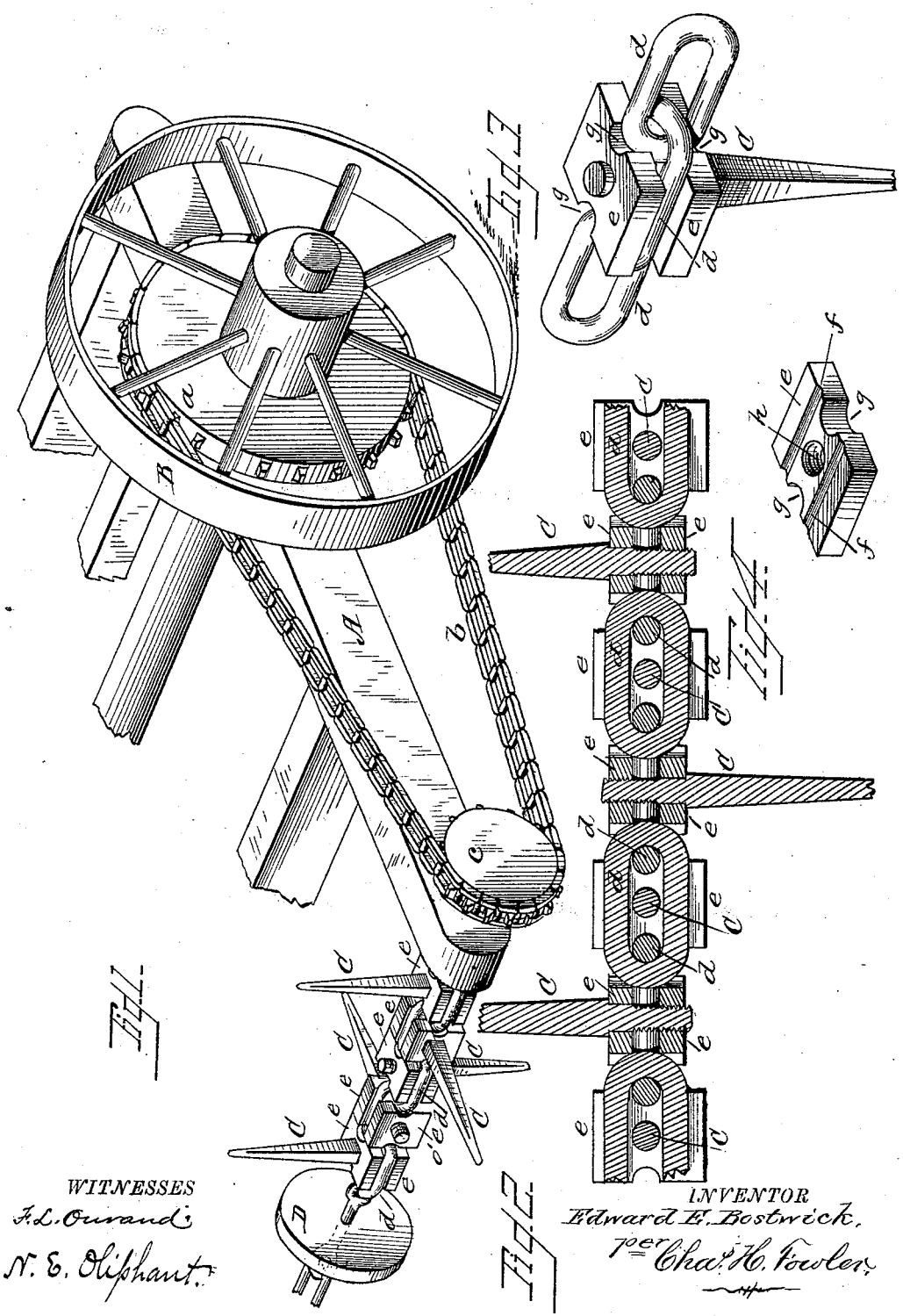
WITNESSES
F. L. Ouvrand
N. E. Oliphant
INVENTOR
Edward E. Bostwick,
per Chas. H. Fowler,
Attorney

UNITED STATES PATENT OFFICE.

EDWARD E. BOSTWICK, OF UNION CITY, MICHIGAN.

HARROW.

SPECIFICATION forming part of Letters Patent No. 291,889, dated January 15, 1884.

Application filed October 25, 1883. (No model.)

*To all whom it may concern:*

Be it known that I, EDWARD E. BOSTWICK, a citizen of the United States, residing at Union City, in the county of Branch and State of Michigan, have invented certain new and useful Improvements in Harrows; and I do hereby declare that the following is a full, clear, and exact description of the same, reference being had to the annexed drawings, making a part of this specification, and to the letters and figures of reference marked thereon.

Figure 1 of the drawings is a perspective view of a portion of a harrow-frame, showing my invention applied thereto; Fig. 2, a longitudinal section of my improved flexible shaft with the harrow-teeth attached; Fig. 3, a detail view, in perspective, of a portion of the flexible shaft; and Fig. 4, a similar view of one of the clamping-blocks.

The present invention has relation to certain new and useful improvements in rotary harrows; and the object thereof is to provide a flexible shaft and means for attaching the harrow-teeth thereto, said shaft being rotated in the ordinary manner by gear or belt power, thereby rendering the harrow more effective in pulverizing the soil. The shaft, being composed of links and joints, will more readily admit of the teeth conforming to the uneven surfaces of the ground, thus materially increasing the successful action of the teeth upon the soil. These several objects I attain by the construction substantially as shown in the drawings, and hereinafter described and claimed.

In the accompanying drawings, A represents a portion of the frame of a harrow, provided with the usual drive-wheels, B, having connected to it a suitable sprocket-wheel, $a$, over which passes a sprocket-chain, $b$, extending from a smaller sprocket-wheel, $c$, rigidly connected to one end of a flexible shaft, having its bearings in the sides of the frame. This flexible shaft consists of a series of links, $d$, and clamping-blocks $e$, into which blocks are inserted the screw-threaded shanks of teeth C, said teeth being arranged at right angles to each other throughout the length of said shaft. These teeth may be of any desirable form—either round, square, or diamond-shaped—in cross-section, and may be curved or straight, as found preferable, and the flexible shaft may be driven by any suitable power, either by gearing or belts and pulleys, as I do not confine myself to the means shown, and therefore reserve the right to substitute any of the ordinary or well-known mechanism or means usually employed for such purpose. The clamping-blocks $e$ of the flexible shaft have each two grooves, $f$, formed upon their inner sides, to provide seats for the outer sides of the links $d$, and the blocks have also notches $g$ on their edges, for the ends of the links to abut against, as shown more clearly in Fig. 3. When the link $d$ is placed upon the block $e$, so that it will rest in the grooves $f$, and in like manner the upper one or opposite block secured in place upon the side of the link, and the screw-threaded shank of the tooth C passed through the hole $h$ in the lower clamping-block, and made to engage with the opening or hole $h$ in the upper block, which is screw-threaded, by continuing to screw up the shank of the tooth, the upper one of the blocks will be drawn firmly down against the link, and thus securely clamp it between the blocks, and by a series of these links and blocks a continuous flexible shaft is obtained, the links throughout the length of the shaft being coupled with each other.

The special feature of my invention is a flexible transverse shaft carrying harrow-teeth, and capable of being rotated by means of suitable drive belts and pulleys or other gearing.

The end links of the shaft may be connected to a convenient device for tightening the shaft when it sags or it is necessary to regulate the tension, as found desirable, and I provide the shaft with wheels D, of any suitable form and size. These wheels I arrange at intervals along the shaft, and connect them so that they will freely rotate independent of the rotary motion of the shaft, the object thereof being to gage the depth of the teeth, and to keep the flexible shaft from dragging on the ground, as well as lifting it over obstacles.

I am aware that harrow-teeth have been connected to a flexible belt, and a series of such belts arranged upon drums suitably located in a frame, the belts revolving as said frame is propelled along the ground; but I lay no claim to such construction.

Having now fully described my invention, what I claim as new, and desire to secure by Letters Patent, is—

1. A flexible shaft for harrows, consisting of a series of links connected together and having harrow-teeth attached, in combination with means for imparting to said shaft a rotary motion, substantially as and for the purpose set forth.

2. A revolving flexible shaft consisting of a series of links connected together, and provided with blocks, nuts, or other like devices, and harrow-teeth detachably connected thereto, substantially as and for the purpose specified.

3. A revolving flexible shaft for harrows, consisting of a series of links connected together, and held between suitable clamping-blocks, to which the harrow-teeth are secured, substantially as and for the purpose set forth.

4. The combination, with a flexible harrow-shaft composed of a series of links connected together, of notched and grooved clamping-blocks provided with means for attaching thereto the harrow-teeth, substantially as and for the purpose specified.

5. A revolving flexible shaft for harrows, consisting of suitable clamping-blocks, to which the harrow-teeth are connected, a series of links, and a series of gage-wheels arranged between the links at intervals along the shaft, substantially as and for the purpose set forth.

In testimony that I claim the above I have hereunto subscribed my name in the presence of two witnesses.

EDWARD E. BOSTWICK.

Witnesses:
 GEO. E. SMITH,
 CHARLES JOHNSON.